US007213790B2

(12) United States Patent
Bailey et al.

(10) Patent No.: US 7,213,790 B2
(45) Date of Patent: May 8, 2007

(54) METHOD AND APPARATUS FOR SUPPORTING AN INSULATED PIPE

(75) Inventors: Randy J. Bailey, Pearland, TX (US); Edward N. Earle, Houston, TX (US)

(73) Assignee: Piping Technology & Products, Inc., Houston, TX (US)

( * ) Notice: Subject to any disclaimer, the term of this patent is extended or adjusted under 35 U.S.C. 154(b) by 84 days.

(21) Appl. No.: 10/957,371

(22) Filed: Oct. 1, 2004

(65) Prior Publication Data

US 2005/0116123 A1 Jun. 2, 2005

Related U.S. Application Data

(60) Provisional application No. 60/508,090, filed on Oct. 2, 2003.

(51) Int. Cl.
*F16L 3/08* (2006.01)
(52) U.S. Cl. ........................................ 248/65; 248/74.1
(58) Field of Classification Search ............. 248/74.1, 248/74.2, 74.3, 72, 65, 73, 67.7, 49
See application file for complete search history.

(56) References Cited

U.S. PATENT DOCUMENTS 4,530,478 A    7/1985   McClellan
4,804,158 A    2/1989   Collins et al.
4,852,831 A    8/1989   Sandstrom
4,951,902 A  * 8/1990   Hardtke ..................... 248/74.1
5,040,753 A    8/1991   Roth
5,078,346 A    1/1992   Deichman
5,381,833 A    1/1995   Cummings et al.
5,924,656 A    7/1999   Okada et al.

OTHER PUBLICATIONS

Piping Technology & Products, Inc. webpage for Clevis Hanger for Insulated Lines, Sep. 30, 2003, Fig. 89.
Pipine Technology & Products, Inc. webpage for Light Two Bolt Pipe Clamp, Oct. 1, 2003, Fig. 50.

* cited by examiner

*Primary Examiner*—Ramon O Ramirez
(74) *Attorney, Agent, or Firm*—Bracewell & Giuliani, LLP

(57) ABSTRACT

A method and apparatus for supporting a portion of a length of insulated pipe by a girder or other support structure, includes at least two pipe clamps, a base member, and a load transfer member attached to each of the at least two pipe clamps, wherein substantially none of the load, or forces and moments, exerted by the pipe, are carried, or transmitted, by the insulation disposed about the pipe.

16 Claims, 3 Drawing Sheets

METHOD AND APPARATUS FOR SUPPORTING AN INSULATED PIPE

RELATED APPLICATIONS

Applicants claim the benefit of U.S. Provisional Patent Application 60/508,090 filed Oct. 2, 2003.

BACKGROUND OF THE INVENTION

1. Field of the Invention

The invention relates to a method and apparatus for supporting an insulated pipe, and in particular insulated pipes for cryogenic and high temperature applications 2. Description of the Related Art In the construction of various types of facilities, such as nuclear power plants, oil refineries, chemical plants, petrochemical plants, gas liquification plants, and power generating plants, pipes are used to carry high and low temperature gases and liquids, such as steam, chilled water, or very cold, or cryogenic, fluids. These pipes are typically provided with insulation, such as layers of insulation batts, blown-in or loose insulation, or foam insulation surrounding the pipe to reduce heat loss from the heated fluid within the pipe, or to reduce heat gain to the fluid or gas within the pipe, from heat flow from the ambient atmosphere. Frequently, such plants have long runs of pipes, and they are typically long enough that the length of pipe requires intermediate supports. The pipe may be subject to a load, or loads, which may result from the weight of the pipe, as well as thermal stresses transferred to the pipe from the very hot, or very cold, fluids and gases passing through the pipe. The load exerted upon the pipe is typically transferred to a supporting structure, such as a girder, beam, the floor of the plant, or any other typical supporting structure utilized in the construction of the previously described facilities. In many instances, the insulation surrounding the pipe does not have sufficient strength so as to permit the insulated pipe to be supported by and to permit the load to be transferred from, the insulated pipe to the support structure.

Various types of methods and apparatus for supporting insulated pipes have been proposed. In general, such previously proposed methods and apparatus suffer from various disadvantages. For example, some previously proposed methods and apparatus require that some type of metallic member, or plate, be welded to the metal pipe being supported, which requires additional labor and costs in connection with supporting a desired length of insulated pipe, as well as may cause undesired stresses to be imparted to the wall of the pipe from the welding process.

As will be hereinafter described, the load exerted upon an insulated pipe, caused by the weight of the pipe, thermal stresses, or other forces exerted upon the pipe by seismic events such as earth tremors and/or earthquake conditions, generally may be comprised of six components. Many of the previously proposed methods and apparatus for supporting an insulated pipe do not permit the transmission of all six of these components of load from the insulated pipe to the support structure.

Another disadvantage in previously proposed methods and apparatus for supporting an insulated pipe is that they may only be capable of use in high temperature applications, such as when a heated fluid is passing through the insulated pipe, but are not adapted for use with very cold, or cryogenically cooled, fluids passing through the insulated pipe. Similarly, some previously proposed methods and apparatus for supporting an insulated pipe are only adapted for use with cryogenic fluids, and are not readily adapted for high temperature applications.

Another disadvantage found in many previously proposed methods and apparatus for supporting an insulated pipe is that to some extent they rely upon the insulation material, to carry and transmit some of the load from the pipe to the support structure. Thus, some previously proposed methods and apparatus for supporting an insulated pipe require the use of a strong insulating material, such as marinite, for the insulating material, or at least a portion of the insulating material. Typically, such stronger insulation materials provide less insulation to the pipe, which is undesired.

Other disadvantages with various types of previously proposed methods and apparatus for supporting an insulated pipe is that they are only capable of being used with only blown-in, or loose, insulation, rather than the more conventional solid layers of semi-circular, cylindrical shaped insulation batts. Lastly, some of the previously proposed methods and apparatus for supporting an insulated pipe are complex mechanical devices, which are labor intensive and costly to manufacture and/or install.

Accordingly, prior to the development of the present invention, there has been no method and apparatus for supporting an insulated pipe, which: is capable of transmitting all six components of load from the pipe to a support structure; does not require welding of an element to the pipe being supported; is capable of being used with both high temperature and cryogenic applications; does not rely upon the insulation material to carry, or transmit, any of the load from the pipe to the support structure; and is economical to manufacture and/or install. Therefore, the art has sought a method and apparatus for supporting an insulated pipe, which: can transmit all six components of load from the pipe to the support structure; does not require welding of an element or component to the pipe being supported; is capable of being used in both high temperature and cryogenic applications; does not rely upon the insulation material to carry, or transmit, any of the load from the pipe to the support structure; and is economical and easy to manufacture and/or install.

SUMMARY OF THE INVENTION

In accordance with the invention, the foregoing advantages have been achieved through the present apparatus for supporting a portion of a length of pipe by a girder or other support structure, the pipe having a longitudinal axis, an outer wall surface, and an insulation material associated with substantially all of the outer wall surface of the length of pipe. This aspect of the present invention may include: at least two pipe clamps, each of the at least two pipe clamps having an inner and an outer wall surface, the inner wall surface generally conforming to the outer wall surface of the pipe to be supported, the at least two pipe clamps being disposed in a spaced relationship from each other along the longitudinal axis of the pipe to be supported; a base member having a longitudinal axis and incapable of bearing the load exerted by the portion of the pipe being supported, the longitudinal axis of the base member generally being disposed substantially parallel with the longitudinal axis of the pipe being supported; and a load transfer member attached to each of the at least two pipe clamps, each load transport member being capable of transmitting the load exerted by the portion of the pipe being supported from the portion of the pipe being supported and the pipe clamp, to the base member, each of the load transfer members having a surface area in contact with its attached pipe clamp, whereby substantially all of the load from the portion of the pipe being supported may be transferred to the girder or other support structure, heat flow through the load transfer members is minimized, and substantially none of the load from the pipe is transmitted to the insulation material to the girder or other support structure.

A feature of the present invention is that the load transfer members may be attached to a portion of the inner wall surface of the pipe clamps, and the load transfer members may contact a portion of the outer wall surface of the pipe. An additional feature of the present invention is that each load transfer member may be attached to a portion of the outer wall surface of the pipe clamp.

A further feature of the present invention is that the pipe clamps, load transfer members, the base member, may be formed of metal. Another feature of the present invention is that no portion of the pipe to be supported may be welded to the pipe clamps, the load transfer members, or the base member. Another feature of the present invention is that a length of pipe to be supported may have at least one length of semi-circular, cylindrical shaped insulation disposed thereon.

In accordance with another aspect of the invention, the foregoing advantages have also been achieved through the present method for supporting a portion of a length of pipe by a girder or other support structure, the pipe being subjected to a load and having a longitudinal axis, an outer wall surface, and an insulation material associated with substantially all the outer wall surface of the length of pipe. This aspect of the present invention may include the steps of: providing at least two pipe clamps associated with the base member, the base member extending in a direction substantially parallel with the longitudinal axis of the length of pipe; providing a load transfer member attached to each of the at least two pipe clamps; supporting the portion of the length of pipe within the pipe clamp; associating the base member with a girder or other support structure; and transmitting substantially all of the load of the portion of pipe through the load transfer members, pipe clamps, and base member to the girder or other support structure, without substantially any of the load being transmitted by the insulation material. Another feature of this aspect of the present invention may include the step of not welding any portion of the length of pipe to any of the pipe clamps, load transfer members, or base members. An additional feature of this aspect of the present invention may include the step of utilizing lengths of semi-circular, cylindrical shaped insulation to insulate the length of pipe being supported.

The method and apparatus for supporting an insulated pipe of the present invention, when compared with previously proposed methods and apparatus for supporting an insulated pipe, have the advantages of: being capable of transmitting all six components of load from the pipe to a support structure; not requiring welding of any component to the pipe being supported; being capable of use in cryogenic and high temperature applications; not relying upon the insulation to carry any of the load; and being economical and easy to manufacture and install.

BRIEF DESCRIPTION OF THE DRAWING

In the drawing:

FIG. 4 is a diagram illustrating the six components of load, which may be exerted by a pipe to be supported to a support structure.

While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
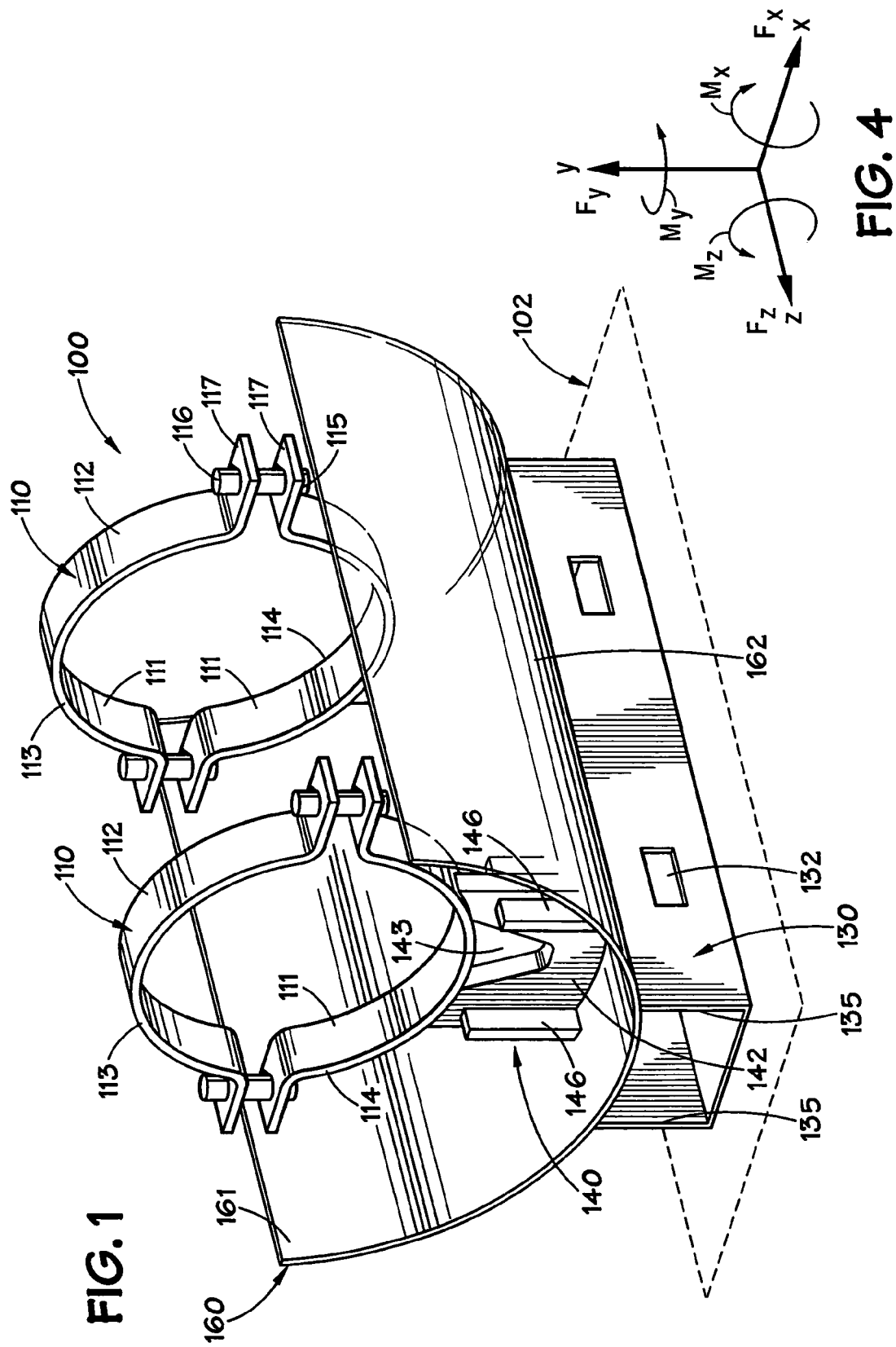
FIG. 1 is a perspective view of an apparatus for supporting a portion of a length of insulated pipe, in accordance with the present invention.
Figure 2:
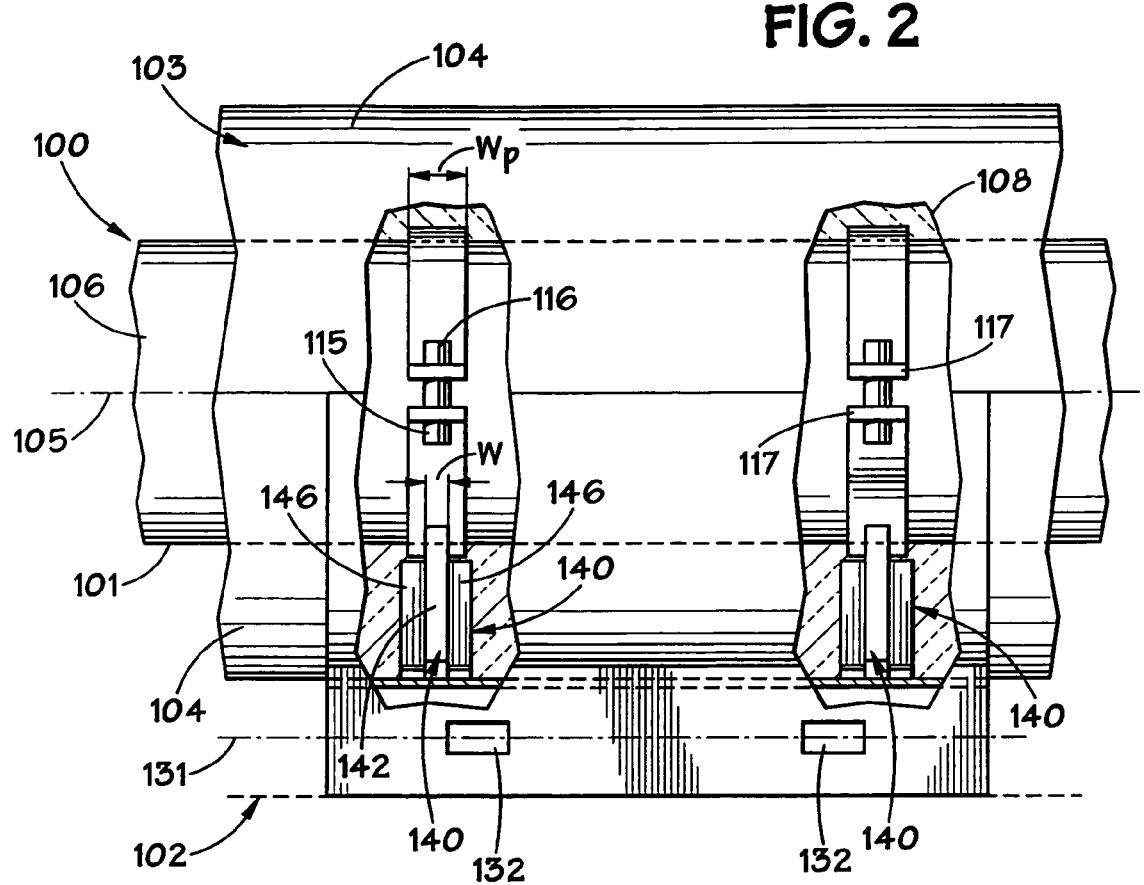
FIG. 2 is a plan, partial cross-sectional view of the apparatus of FIG. 1.
Figure 3:
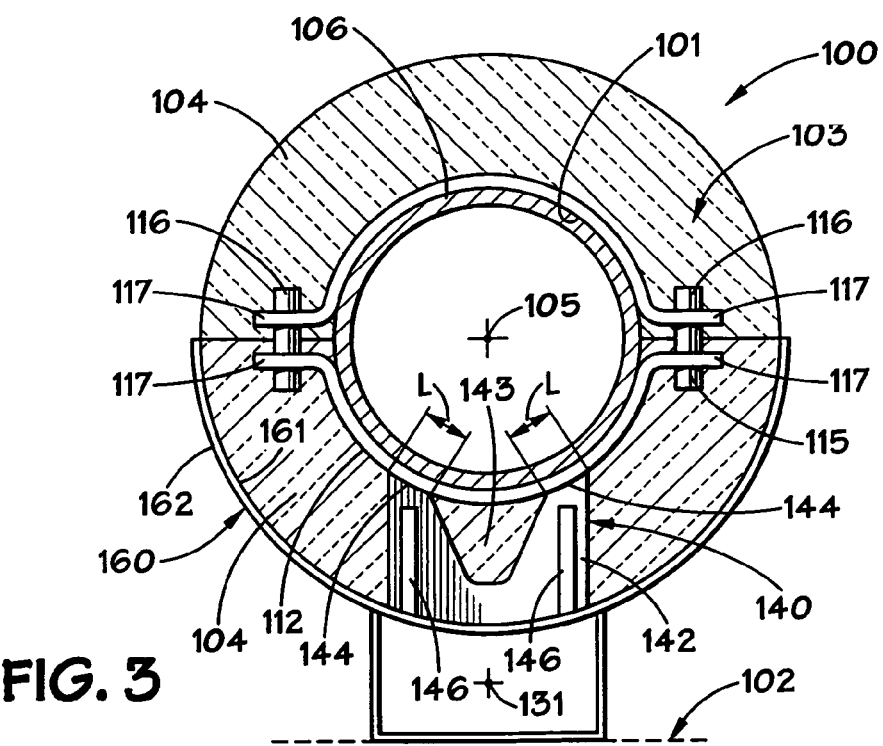
FIG. 3 is a partial cross-sectional end view of the apparatus of FIG. 1.

With reference to FIGS. 1–3, an apparatus 100 for supporting a portion of a length of pipe 101 (FIGS. 2 and 3) by a girder, beam, floor, or other support structure, shown in phantom lines 102, is illustrated. For ease of illustration, pipe 101 and insulation material 103 are not illustrated in FIG. 1. Pipe 101 has a longitudinal axis 105, an outer wall surface 106, and insulation material 103 is generally associated with substantially all of the outer wall surface 106 of the length of pipe 100. For ease of illustration, as will hereinafter be described in greater detail, a portion of apparatus 100 and insulation 103 is removed, as shown at phantom lines 108.

With reference to FIG. 4, the six components of load, or loads, from pipe 101 are diagrammatically illustrated as the forces Fx, Fy, and Fz, which are forces exerted in the direction of the x, y, and z axes, as is known in the art. The other three components of load, are the moments Mx, My, and Mz, or torsional, or twisting forces exerted about the x, y, and z axes, as is also known in the art. As will hereinafter be described, the apparatus 100 of the present invention is capable of transmitting, or transferring, all of these six components of load, from the pipe 101 to the girder, beam, floor, or other support structure 102. As, is know in the art or technological field, the load results from the weight of the length of pipe 101 being supported, as well as from thermal stresses resulting from the either cold or hot fluid (not shown) flowing, or passing, through pipe 101. As hereinafter described in greater detail, because the apparatus 100 is directly attached to the pipe 101, and then encased in insulation 103, all six components of load, as previously described, may be transmitted from the pipe 101 to the support structure 102, and the insulation is not subjected to any kind of load.

Preferably, the insulation material 103 is of conventional design and is preferably formed in lengths of semi-circular, cylindrical shaped insulation 104, portions of two of such lengths of insulation material 104 being illustrated in FIGS. 2 and 3.

Again, with reference to FIGS. 1–3, the apparatus 100 of the present invention generally includes at least two pipe clamps 110, a base member 130, and a load transfer member 140 attached to each of the at least two pipe clamps 110. Preferably two pipe clamps are utilized in apparatus 100, but a greater, or lesser, number of pipe clamps could be utilized, if desires. Each of the at least two pipe clamps 110 have an inner wall surface 111 and an outer wall surface 112, and the inner wall surfaces 111 generally conform to the outer wall surface 106 of the pipe 101 to be supported. The at least two pipe clamps 110 are disposed in a base relationship from each other along the longitudinal axis 105 of the pipe 101. The pipe clamps 110 may be conventional construction in our form of two generally semi-circular halves 113, 114, which may be clamped together by use of conventional nuts and bolts, shown schematically at 115, 116. Upon tightening of the nuts 115 upon both 116, which bear against the conventional flanges 117, pipe clamps 110, the clamps are brought into engagement which the outer wall surface 106 of pipe 101, as shown in FIG. 3. Preferably, pipe clamps 110 are of conventional construction, and formed of any suitable metal, as is known in the art. Preferably, the pipe clamps 110 have a generally circular cross-sectional configuration when the two haves 113, 114 are assembled. Of course, if pipe 101 is not of a generally circular cross-sectional configuration, pipe clamps 110 could be formed with a cross-sectional configuration, which would permit pipe 101 to be clamped upon, and held in place by pipe clamps 110. If desired, pipe clamps could be manufactured of some other suitable material, such as a plastic material, provided the plastic material has the requisite strength and temperature characteristics to permit pipe clamps 110 to support pipe 101, transmit the load from pipe 101, and withstand the high or low temperature of pipe 101, caused by the corresponding temperature of the fluid (not shown) passing through pipe 101.

Still, with reference to FIGS. 1–3, base member 130 has a longitudinal axis 131, which is generally disposed substantially parallel with the longitudinal axis 105 of the pipe 101 being supported. Base member 130 is capable of bearing the load exerted by the portion of the pipe 101 being supported, and as illustrated in FIGS. 1–3, has a generally U-shaped configuration. It may be formed of a length of a beam, girder, or similar structural member. Base member 130 is preferably formed of metal, as is conventional in the art, and of course may be formed of other materials having the requisite strength characteristics to function in the manner described. Base member 130 may include a plurality of openings 132, which permit the passage of securing straps, cables, or similar fastening devices to assist in securing, or attaching, base 130 to the desired support structure 102.

Still, with reference to FIGS. 1–3, it is seen that a load transfer member 140 is attached to each of the two pipe clamps 110. Each load transfer member 140 is capable of transmitting the load exerted by the portion of the pipe 101 being supported from the pipe 101 and pipe clamp 110 to the base member 130. In this regard, each load transfer member 140 is preferably welded to its associated pipe clamp 110, and each load transfer member 140 is preferably formed of metal. On knowing the weight of the pipe 101 to be supported and knowing likely forces from thermal stresses, one of ordinary skill in the art can readily design and size load transfer member 140, so as to be capable of transmitting the necessary load. Each load transfer member is preferably attached to a portion of the outer wall surface 112, pipe clamp 110. Preferably, each load transfer member 140 is a plate member 142 attached to, and upon which rests, a portion of a pipe clamp 110. As seen in FIGS. 1 and 3, plate number 142 has a generally U-shaped configuration, wherein a generally U, or V, shaped opening 143 is formed at the upper end of plate number 142. Thus, the upper end of each plate member 142 has a surface area 144 in contact with the pipe clamp 110 to which plate 142 is attached. The surface area 144 of each load transfer member 140 is generally defined by a width W and length L dimension, from W being illustrated in FIG. 2 and L being illustrated in FIG. 3. Similarly, pipe clamp 110 has a width dimension $W_p$. Thus, the surface area 144 of the load transfer member 140 in contact with pipe clamp 110 is the product of the L and W dimensions, and in the case of a generally U, or V, shaped plate member 142, as shown in FIGS. 1 and 3, there are two surface areas in contact with the outer wall surface 112 of pipe clamp 110. As shown in FIG. 3, a portion of the outer wall surface 106 of pipe 101 is in contact with the inner wall surface 111 of pipe clamp 110, whereby heat may be transferred from pipe 101 to pipe clamp 110, and then through the surface area 144 into load transfer member 140. Similarly, if a cold fluid is being passed through pipe 101, heat may flow from the outside ambient atmosphere in a path opposite to that previously described and into pipe 101. Preferably, the width dimension W of load transfer member 140 is substantially less than the width dimension $W_p$ of the pipe clamp 110, whereby the heat loss, or heat transfer, from pipe 101 to load transfer member 140 is minimized, and conversely, heat gain is also minimized if a cold fluid is passing through pipe 101.

Still, with reference to FIGS. 1–3, each load transfer member 140 is attached to base member 130. Load transfer member 140 is attached to base member 130 via a cradle member 160, cradle 160 having an upper wall surface 161 and a lower wall surface 162, and the load transfer members 140 are attached to the upper wall surface 161 of cradle 160. Preferably, the lower end of load transfer members 140 are welded to the upper wall surface 161 of cradle 160. If desired, at least some, and preferably all, of the plate members 142 which form load transfers members 140 may be provided with reinforcing ribs 146 which provide additional support for pipe 101 and pipe clamps 110; however, the reinforcing ribs 146 are not in direct contact with pipe 101 or pipe clamps 110, so as to minimize heat loss, or heat gain, from or to pipe 101 and pipe clamp 110. Preferably, pipe 101 is not welded to pipe clamps 110, load transfer members 140, or base member 130, although if desired, and it's acceptable, a portion of pipe 101 could be welded to pipe clamp 110.

As illustrated in FIGS. 1–3, cradle 160 has a generally semi-circular configuration and extends in a direction along the longitudinal axis 131 of base member 130. With the configuration of cradle 160 illustrated in FIGS. 1–3, apparatus 100 has a low exterior surface temperature in that the semi-circular shape cradle 160 provides a large surface area for dissipating the heat which may be transferred from pipe clamp 110 through load transfer member 140 to cradle 160. If exterior surface temperature is not an issue, whereby base member 130 may have a higher temperature, cradle 160 may not have a semi-circular configuration, or span a 180° arc, but could have a 90° arc or less. In this regard, cradle 160 could also be a flat plate member extending in a direction along the longitudinal axis 131 of base member 130, and could just span the space between vertical legs 135 (FIG. 1) of base member 130. Alternatively, base member 130 could have a T-shaped cross-sectional configuration, rather than the U-shaped configuration illustrated, whereby the load transfer members 140 could be welded to the upstanding leg of the T-shaped base member and the horizontal portion of the T-shaped member could rest upon support structure 102.

As shown in FIGS. 2 and 3, after pipe 101 has been secured within pipe clamps 110, insulation material 103, or preferably lengths of semi-circular cylindrical shaped insulation 104 may be used to encase pipe 101.

Figure 5:
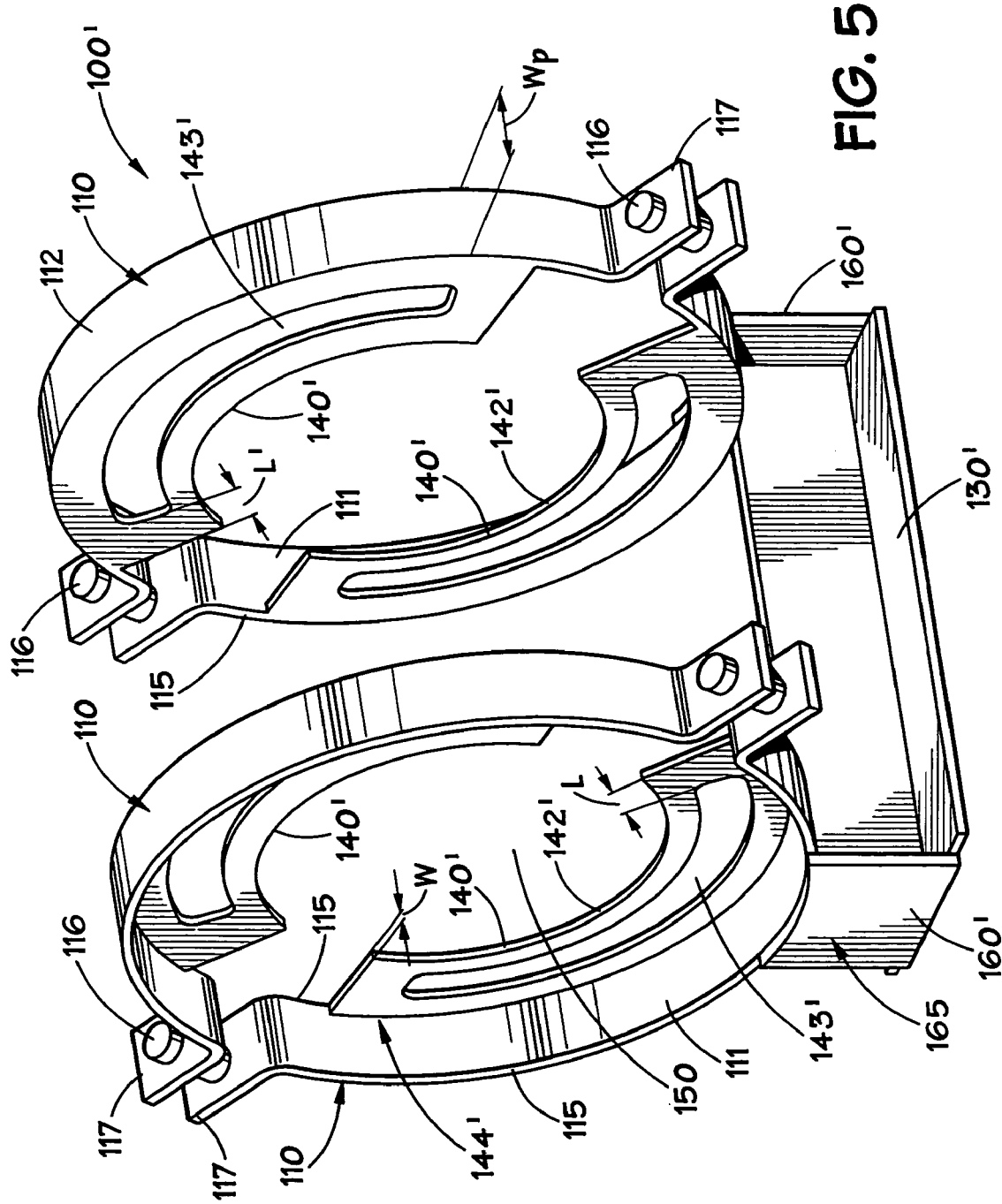
FIG. 5 is a perspective view of a second embodiment of an apparatus for supporting a portion of a length of insulated pipe in accordance with the present invention.

With reference to FIG. 5 another embodiment of an apparatus 100' for supporting a length of pipe 101 is illustrated. The same reference numerals are used for components previously described, and primed referenced numerals are utilized for components that are similar to those bearing the same reference numeral and previously described. Apparatus 100' includes two pipe clamps 110, a base member 130' having a generally T-shaped cross-sectional configuration, and a load transfer member 140' is attached to the at least two pipe clamps 110. In the embodiment of apparatus 100' of FIG. 5, the load transfer members 140' are attached to a portion of the inner wall surface 111 of the pipe clamps 110, and the load transfer members 140' contact a portion of the outer wall surface 106 of pipe 101 (FIG. 1). As previously described, load transfer members 140', pipe clamps 110 and base member 130' are all formed of metal, although other materials could be utilized if desired. The load transfer members 140' may be welded to the inner wall surface 111 of each pipe clamp 110, or may be welded to an exterior edge surface 115 of the pipe clamp halves 113, 114. Preferably, the load transfer members 140' generally define an opening 150, which substantially corresponds to the outer wall surface 106 of the pipe 101 disposed within the opening 150. Preferably some of the load transfer members 140' are semi-circular shaped rib, or plate members, 142' and are attached to the lower, inner wall surface 111 of pipe clamps 110. Preferably, there are also semi-circular shaped rib, or plate members 142', attached to the upper, inner wall surface 111 of pipe clamps 110, as illustrated in FIG. 5. The load transfer members 142' preferably have a circumferentially extending slot, or opening, 143' formed therein. Thus, the load transfer members 142' have a surface area 144' in contact with pipe clamp 110, and the surface area 144' is again generally defined by a width and length dimension W' and L'. The width dimension W' is again preferably substantially less than the width dimension $W_p$ of the pipe clamp 110, whereby heat flow, or conversely heat gain, is again minimized. A cradle member 160' may be provided, which has an upper wall surface 165, as by welding, attached to pipe clamp 110, as by welding, and cradle 160' is secured to the base member 130' as by welding, as illustrated in FIG. 5. After pipe 101 is disposed within the opening 150, defined by pipe clamps 110 and load transfer members 140', the insulation material 103 or 104, may be disposed about the outer wall surface 106 of pipe 101 as previously described. If desired, other shapes of load transfer members 142' could be utilized, as well as the upper load transfer members 142' could have a different configuration from those of the lower load transfer members 142'.

The moments and forces of the load exerted by pipe 101, as illustrated in FIG. 4, may be effectively transmitted from pipe 101 to the support structure 102 by the apparatus 100, 100' of the present invention. The apparatus 100, 100' of the present invention does not require welding of the pipe 101 being supported, and apparatus 100, 100' may be used in either high or low temperature applications. Lastly, apparatus 100, 100' do not rely upon the insulation material 103 to carry, or transmit, any of the forces or moments of the load from the pipe 101 to the support structure 102, nor is the insulation subject too being crushed by the load.

It is to be understood that the invention is not limited to the exact details of construction, operation, exact materials, or embodiment shown in described, as obvious modifications and equivalents will be apparent to one skilled in the art, or technological field. For example, instead of the base members 130, 130' resting upon a support structure 102, the base members 130, 130', could be suspended from, and be disposed beneath, a suitable support structure 102, if desired. Accordingly, the invention is therefore to be limited only by the scope of the appended claims.

The invention claimed is:

1. An apparatus for supporting a portion of a length of pipe by a girder or other support structure, the pipe having a longitudinal axis, an outer wall surface and an insulation material associated with substantially all of the outer wall surface of the length of pipe, compnsing:
   a) at least two pipe clamps, each of the at least two pipe clamps having an inner and an outer wall surface, the inner wall surface generally conforming to the outer wall surface of the pipe to be supported, the at least two pipe clamps being disposed in a spaced relationship from each other along the longitudinal axis of the pipe to be supported;
   b) a base member having a longitudinal axis and capable of bearing the load exerted by the portion of the pipe being supported, the longitudinal axis of the base member generally being disposed substantially parallel with the longitudinal axis of the pipe being supported; and
   c) a load transfer member attached to each of the at least two pipe clamps, each load transport member being capable of transmitting the load exerted by the portion of the pipe being supported from the portion of the pipe being supported and the pipe clamp to the base member, each of the load transfer members having a surface area in contact with its attached pipe clamp, wherein the load transfer members are attached to a portion of the inner wall surface of the pipe clamps, and the load transfer members contact a portion of the outer wall surface of the pipe whereby substantially all of the load from the portion of the pipe being supported may be transferred to the girder or other support structure, heat flow through the load transfer members is minimized, and substantially none of the load from the pipe is transmitted through the insulation material to the girder or other support structure.

2. The apparatus of claim 1, wherein the load transfer members generally define an opening which substantially corresponds to the outer wall surface of the pipe disposed within the opening.

3. The apparatus of claim 1, wherein at least some of the load transfer members are semi-circular shaped rib members attached to the lower, inner wall surface of the pipe clamps.

4. The apparatus of claim 3, wherein the semi-circular shaped rib members have a circumferentially extending slot formed therein.

5. The apparatus of claim 1, wherein a cradle member having an upper wall surface is secured to the base member and a portion of each pipe clamp is attached to the cradle member.

6. The apparatus of claim 1, wherein the portion of the pipe to be supported is not welded to the pipe clamps, load transfer members or the base member.

7. The apparatus of claim 1, wherein the pipe clamps, load transfer members, and the base member are formed of metal.

8. The apparatus of claim 1, including a length of pipe having at least one length of semi-circular, cylindrical shaped insulation thereon.

9. The apparatus of claim 1, wherein each pipe clamp has a width dimension, and the surface area of each load transfer member is generally defined by a width and length dimension, the width dimension of the load transfer member being substantially less than the width dimension of the pipe clamp.

10. An apparatus for supporting a portion of a length of pipe by a girder or other support structure, the pipe having a longitudinal axis, an outer wall surface and an insulation material associated with substantially all of the outer wall surface of the length of pipe, comprising:

a) at least two pipe clamps, each of the at least two pipe clamps having an inner and an outer wall surface, the inner wall surface generally conforming to the outer wall surface of the pipe to be supported, the at least two pipe clamps being disposed in a spaced relationship from each other along the longitudinal axis of the pipe to be supported;

b) a base member having a longitudinal axis and capable of bearing the load exerted by the portion of the pipe being supported, the longitudinal axis of the base member generally being disposed substantially parallel with the longitudinal axis of the pipe being supported;

c) a load transfer member attached to each of the at least two pipe clamps, each load transport member being capable of transmitting the load exerted by the portion of the pipe being supported from the portion of the pipe being supported and the pipe clamp to the base member, each of the load transfer members having a surface area in contact with its attached pipe clamp, each load transfer member being attached to a portion of the outer wall surface of a pipe clamp, and;

d) a cradle having an upper and a lower wall surface is disposed between the load transfer members and the base member, and the load transfer members are attached to the upper wall surface of the cradle member, whereby substantially all of the load from the portion of the pipe being supported may be transferred to the girder or other support structure, heat flow through the load transfer members is minimized, and substantially none of the load from the pipe is transmitted through the insulation material to the girder or other support structure.

11. The apparatus of claim 10, wherein a portion of the outer wall surface of the pipe contacts the inner wall surface of each pipe clamp.

12. The apparatus of claim 10, wherein each load transfer member is a plate member attached to, and upon which rests, a portion of a pipe clamp.

13. The apparatus of claim 12, wherein at least some of the plate members have a generally U-shaped configuration.

14. The apparatus of claim 12, wherein at least some of the plate members have reinforcing ribs attached thereto.

15. The apparatus of claim 10, wherein each load transfer member is attached to the base member.

16. The apparatus of claim 10, wherein the cradle member has a generally semi-circular configuration and extends in a direction along the longitudinal axis of the base member.

* * * * *